UNITED STATES PATENT OFFICE.

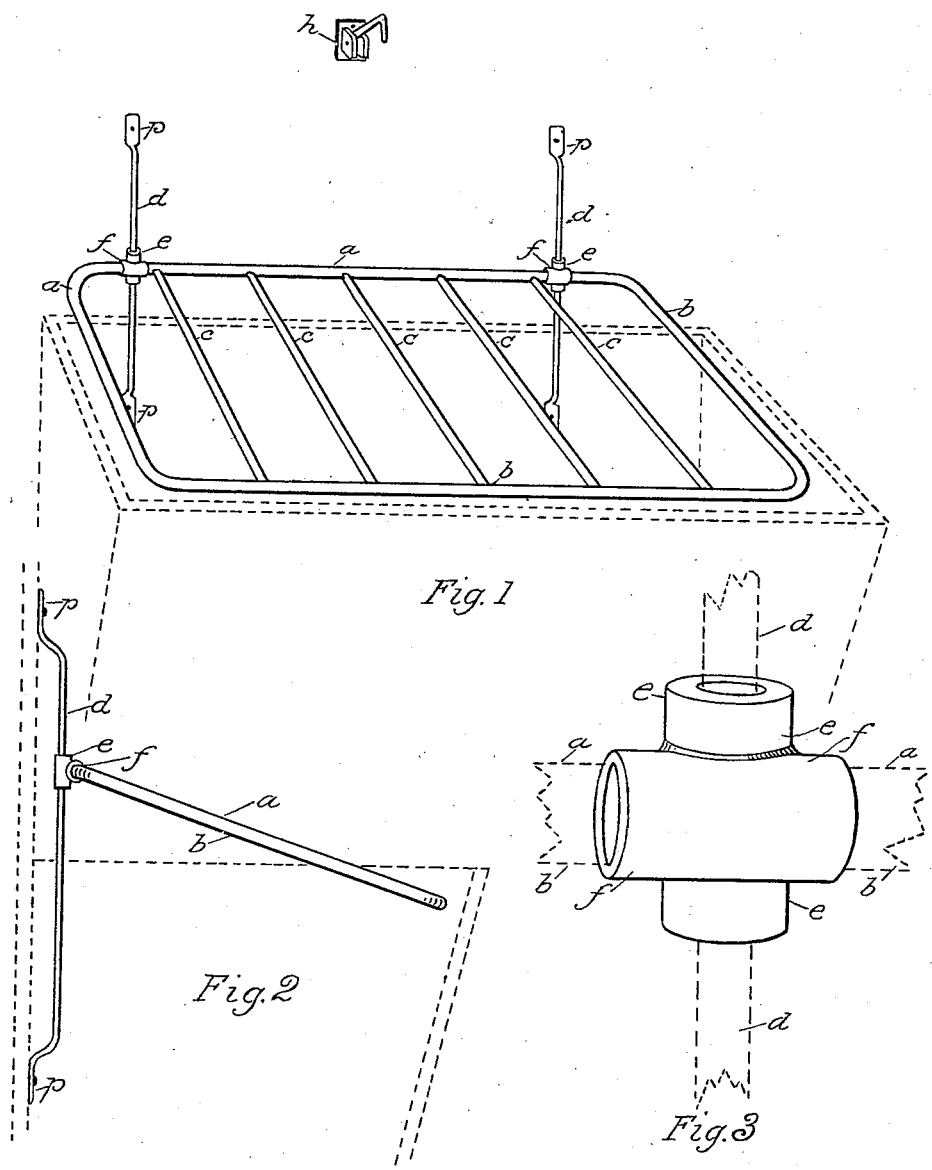

WILLIAM A. BROWN, OF ST. JOSEPH, MISSOURI.

HAY-GATE FOR MANGERS.

1,018,095.      Specification of Letters Patent.      Patented Feb. 20, 1912.

Application filed November 30, 1908. Serial No. 465,469.

*To all whom it may concern:*

Be it known that I, WILLIAM A. BROWN, a citizen of the United States, residing at St. Joseph, in the county of Buchanan and State of Missouri, have invented a new and useful Manufacture in the Nature of a Hay-Gate for Mangers, of which the following is a specification.

My invention relates to improvements in manger devices in which a swinging gate or screen is adjusted within the manger on hinges and vertical guides; and the objects of my invention are to provide a gate or screen to retain the hay or other feed within the manger until consumed, and to prevent the same from being tossed about and wasted. I accomplish these objects by the mechanism illustrated in the accompanying drawings, in which—

Figure 1 is a perspective of the device in position in the manger, Fig. 2 is an end view of the device, and Fig. 3 is an enlarged detail view of the sliding hinge hereinafter described.

In the drawings, the reference letter $a$ indicates a frame slightly smaller than the manger in which it is to be used, and $c$ are cross-bars in such frame spaced at sufficient intervals to permit the feeding animal to insert his nose and reach the hay or other feed. Vertical rods $d$ act as guides in the automatic vertical adjustment of the position of the gate $a$ to the quantity of hay underneath, as described below, and prevent any lateral movement while giving free play up and down, said guide rods being securely attached to the wall or back of the manger at the points $p$. Mounted on these guide rods $d$ are my improved castings embodying sliding hinges, the same being each formed integral and embodying the vertical slide members $e$ adapted to embrace the guide-rods $d$ and vertically movable therein, and the horizontal hinge members $f$ through which pass the rear bar of the frame $a$, as shown, arranged at right angles, said hinge members being formed in front of the other members. The sliding hinges so attach the gate $a$ to the guide-rods $d$ that the gate is held in place in the manger but may be raised out of the way when the manger is to be filled, and when the hay is supplied, the gate both slides and swings downward and presses on the hay, especially at the outer edge of the manger. The hinges $f$ are bored slightly larger than the frame $a$ which passes through them, forming a horizontal hinge as indicated, permitting the gate to swing to an upright position and return.

In using my device, the vertical guides $d$ are attached to the wall or manger frame at $p$. To place hay in the manger the gate $a$ is swung upward on the sliding hinges, and may be fastened up, as by a hook $h$. After the hay or feed is supplied the gate is dropped and presses upon the hay, by its weight retaining the latter in place in the manger so that it cannot be tossed about and wasted by the feeding animal. By placing the hay in the back part of the manger the gate may be dropped at a slant so as to lock it down by means of the front wall of the manger. As the food is eaten the gate automatically adjusts itself.

It will be observed that forming my hinge members in front of the vertical members $e$, makes it possible for me to use a frame for the manger, that can extend to the outside of said hinge members, in fact extend from one wall of the manger to the other. This is desirable, since in the first place, the end walls of the manger will guide the gate endwise, also it facilitates the making of a gate without any abrupt ends, which obviates any danger of the halter rope of the animal being caught therein, also this allows for the location of the guide rods anywhere between the ends of the manger.

Having thus described my invention, what I claim as new and desire to secure by Letters Patent is:—

In combination with a manger, vertical guide-rods at the rear thereof, and a gate formed of a rectangular frame and cross-bars, the rear bar of said rectangular frame being mounted across and in front of said guide-rods, slidably and pivotally connected thereto, and the free side of said gate adapted to swing above and below the pivotal point of said rear bar, whereby said gate can be locked in the manger by lowering said free side below said pivotal point.

WILLIAM A. BROWN.

Witnesses:
A. M. JOHN KEARFUL,
C. P. HEADLY.